United States Patent
Lee et al.

(10) Patent No.: US 7,839,572 B2
(45) Date of Patent: Nov. 23, 2010

(54) LAMINATED LENS PACKAGE AND METHOD OF FABRICATING THE SAME

(75) Inventors: Jinuk Lee, Gyunggi-do (KR); Chang Hwan Choi, Gyunggi-do (KR); Sung Soo Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/285,239

(22) Filed: Sep. 30, 2008

(65) Prior Publication Data

US 2009/0153970 A1 Jun. 18, 2009

(30) Foreign Application Priority Data

Dec. 18, 2007 (KR) ...................... 10-2007-0133298

(51) Int. Cl.
*G02B 27/10* (2006.01)
(52) U.S. Cl. ..................................................... 359/619
(58) Field of Classification Search ................. 359/796, 359/797, 619, 740, 717, 718, 741
See application file for complete search history.

(56) References Cited

U.S. PATENT DOCUMENTS

| | | | | |
|---|---|---|---|---|
| 5,684,636 A * | 11/1997 | Chow et al. | ................. | 359/665 |
| 6,914,725 B2 | 7/2005 | Fujita | | |
| 2006/0132919 A1 * | 6/2006 | Schnell et al. | .............. | 359/565 |

FOREIGN PATENT DOCUMENTS

| | | |
|---|---|---|
| JP | 2004-163695 | 6/2004 |
| KR | 10-2006-0097193 | 9/2006 |
| KR | 10-2007-0000567 | 1/2007 |

\* cited by examiner

*Primary Examiner*—Alicia M Harrington (57) ABSTRACT

A laminated lens package and a method of fabricating the same are disclosed. The laminated lens package includes a first lens layer including a first lens element formed at one surface thereof through a first mold; a second lens layer including a second lens element formed at one surface thereof through a second mold, corresponding to a location of the first lens element; and a polymer layer provided between the first lens layer and the second lens layer. Accordingly, desired refraction can be implemented by controlling a refractive index. Also, since no spacers are used, defects caused by adhesion of an adhesive agent do not occur. Thus, a fabrication process is simplified, so that productivity can be improved and a fabrication cost can be reduced.

6 Claims, 6 Drawing Sheets

LAMINATED LENS PACKAGE AND METHOD OF FABRICATING THE SAME

CROSS-REFERENCE TO RELATED APPLICATIONS

This application claims the priority of Korean Patent Application No. 2007-133298 filed on Dec. 18, 2007, in the Korean Intellectual Property Office, the disclosure of which is incorporated herein by reference.

BACKGROUND OF THE INVENTION

1. Field of the Invention

The present invention relates to a laminated lens package and a method of fabricating the same, and more particularly, to a laminated lens package capable of implementing desired refraction by forming a polymer layer, using a polymer material having a low refractive index between lens substrates each including a lens element, and a method of fabricating the laminated lens package.

2. Description of the Related Art

In general, mobile terminals such as mobile phones and personal digital assistants have been developed to provide a simple telephone function and support multi-convergence of, e.g., music, movies, TVs and games. A camera module may be considered as one of representative devices leading to the multi-convergence.

An optical system represented by the camera module includes a plurality of regularly stacked lenses in order to implement optical performance suitable for application characteristics. In response to increasing demands for the optical system, a method of forming a wafer-scale lens by using a semiconductor process has been proposed for mass production.

Figure 1A:
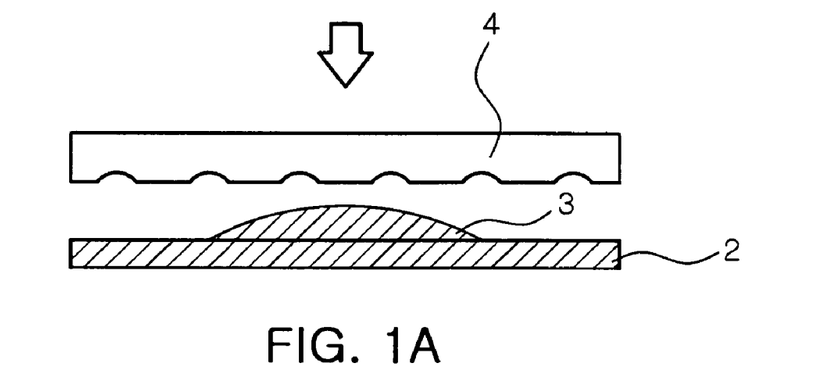
FIGS. 1A through 1C are schematic views illustrating a general wafer-scale lens fabrication process.
Figure 1B:
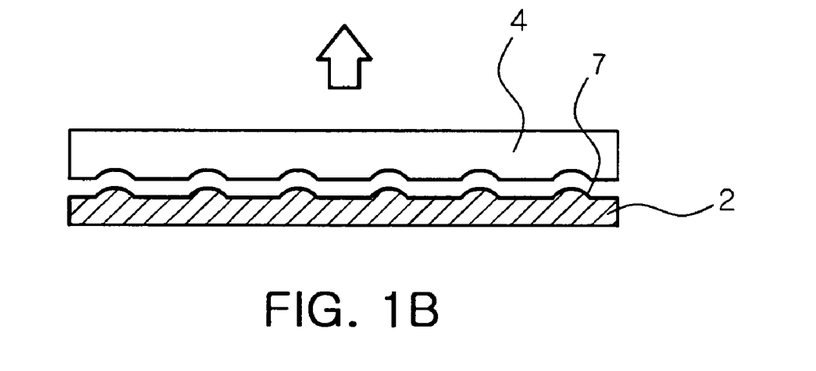
Figure 1C:
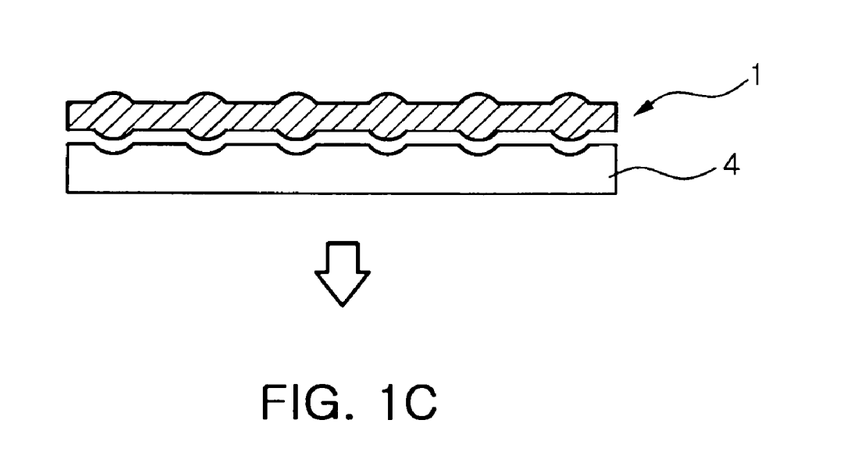

FIGS. 1A through 1C are schematic views for explaining a process of fabricating a general wafer-scale lens.

Referring to FIGS. 1A through 1C, an ultraviolet (UV)-curable resin 3 is provided on a lens substrate 2 formed of a transparent material. Then, a mold 4 including a plurality of recess patterns for respectively forming a plurality of lens elements 7 is pressed on the UV-curable resin 3 toward the lens substrate 2.

Thereafter, UV light is emitted to cure the UV-curable resin 3, and then the mold 4 is separated from the lens substrate 2. Consequently, the plurality of lens elements 7 are formed at one surface of the lens substrate 2 at regular intervals.

Also, as shown in FIG. 1C, another plurality of lens elements 7 may be formed on the other surface of the lens substrate 2 in the same manner as described above with reference to FIGS. 1A and 1B.

Figure 2A:
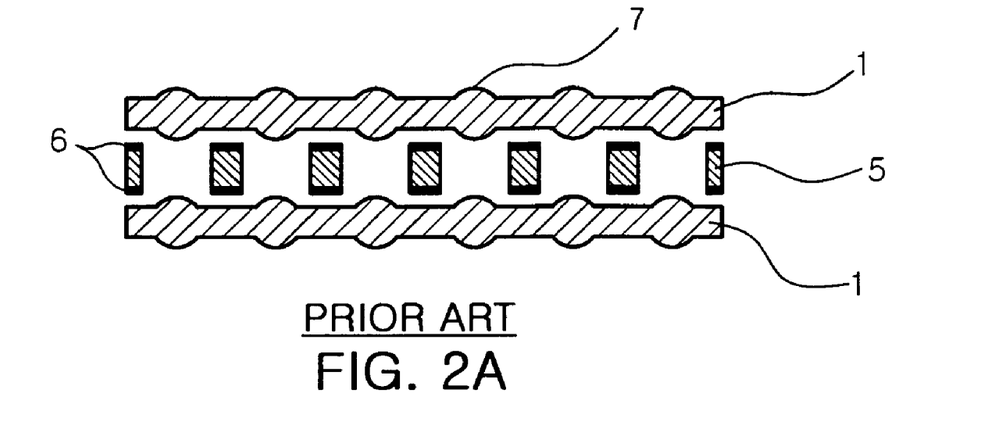
FIGS. 2A through 2C are schematic views illustrating a method of fabricating a laminated lens package by laminating general wafer scale lenses.
Figure 2B:
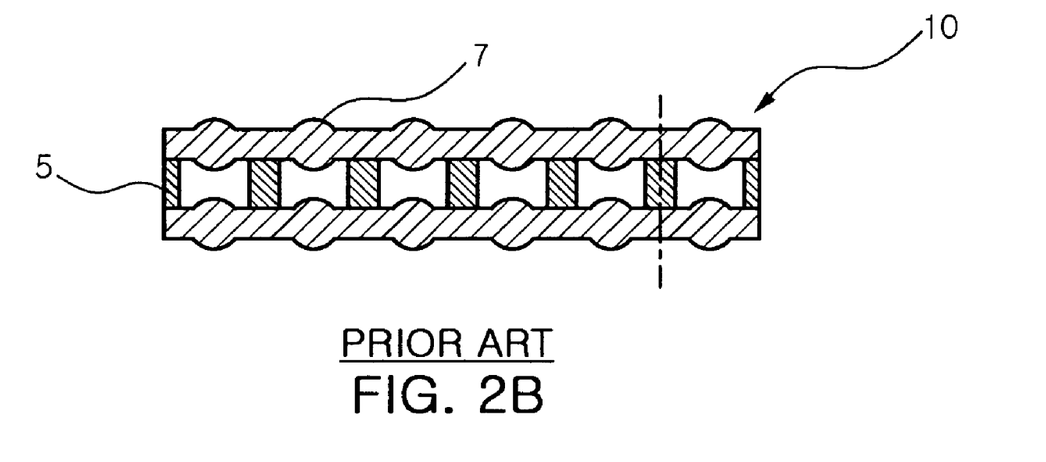
Figure 2C:
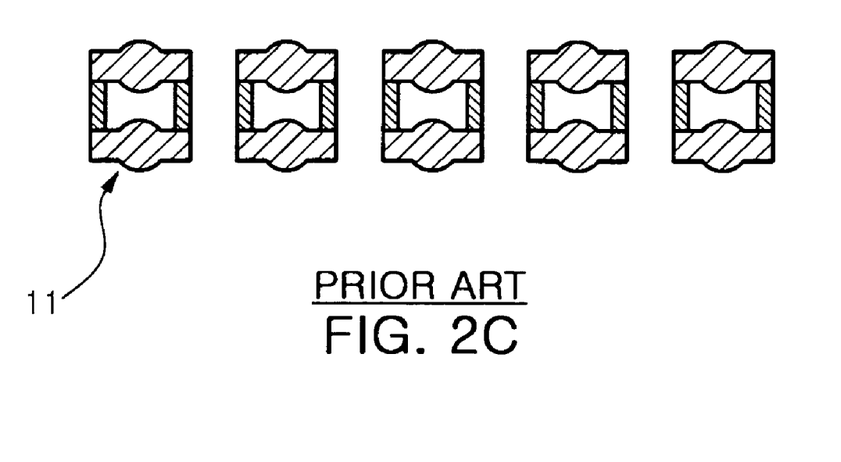

FIGS. 2A through 2C are schematic views for explaining a method of fabricating a laminated lens package by laminating general wafer-scale lenses.

Referring to FIGS. 2A and 2B, spacers 5 are respectively adhered to one side of the lens layer 1 between the lens elements 7 by an adhesive agent 6. Thereafter, another lens layer 1 including lens elements 7 are laminated on the spacer-adhered lens layer 1, thereby fabricating a laminated lens package 10 including the plurality of lens elements 7.

An interval between the lens layers 1 is controlled by the spacers 5. The lens layers 1 are spaced apart from each other by the spacers 5 so that incident light can pass along a previously calculated refraction path.

The fabricated laminated lens package 10 is diced into each object to be used as a lens-lamination structure 11 constituting an optical system.

However, when the lens layer 1 is laminated on the spacer 5, it is very difficult to coaxially place the facing lens elements 7. For this reason, a refraction path easily deviates.

Also, defects may occur as the adhesive agent 6 fixing the spacer 5 leaks to the outside and adheres to the lens element 7.

SUMMARY OF THE INVENTION

An aspect of the present invention provides a laminated lens package which can implement desired refraction by forming a polymer layer, using a polymer material having a low refractive index between lens substrates each including a lens element, and a method of fabricating the laminated lens package.

According to an aspect of the present invention, there is provided a laminated lens package including: a first lens layer including a first lens element formed at one surface thereof through a first mold; a second lens layer including a second lens element formed at one surface thereof through a second mold, corresponding to a location of the first lens element; and a polymer layer provided between the first lens layer and the second lens layer.

The first lens layer may further include a fourth lens element formed at the other surface of the first lens layer through a fourth mold, corresponding to a location of the first lens element.

The second lens layer may further include a third lens element formed at the other surface of the second lens layer through a third mold, corresponding to a location of the second lens element.

The polymer layer may have a refractive index lower than refractive indices of the first lens layer and the second lens layer.

The first lens layer and the second lens layer may have identical or different refractive indices.

According to another aspect of the present invention, there is provided a method of fabricating a laminated lens package, including: providing a first lens layer including a first lens element formed at one surface of a first lens substrate; providing a second lens layer including a second lens layer element formed at one surface of a second lens substrate; disposing the first lens layer and the second lens layer such that the first lens element and the second lens element are coaxially spaced apart from each other at a predetermined interval; and filling a polymer material between the first lens layer and the second lens layer to form a polymer layer.

The method may further include providing a fourth lens element at the other surface of the first lens substrate, corresponding to a location of the first lens element of the first lens layer.

The method may further include providing a third lens element at the other surface of the second lens substrate, corresponding to a location of the second lens element of the second lens layer.

The first lens layer and the second lens layer may have identical or different refractive indices.

The polymer layer may have a refractive index lower than refractive indices of the first lens layer and the second lens layer.

According to still another aspect of the present invention, there is provided a method of fabricating a laminated lens package, including: providing a first lens layer including a first lens element formed at one surface of a lens substrate through a first mold; providing a polymer material at a predetermined height on the first lens layer including the first lens element; pressing a second mold onto the polymer layer to form a pattern for a second lens element at a location in the polymer layer corresponding to a location of the first lens element; providing a resin on the polymer layer in which the pattern for the second lens element is recessed; and providing a second lens layer including the second lens element at one surface thereof.

The first lens layer and the second lens layer may have identical or different refractive indices.

The method may further include pressing a third mold onto the resin provided on the polymer layer to simultaneously form the second lens element and a third lens element at the second lens layer.

The third lens element may be provided at the other surface of the second lens layer, corresponding to a location of the second lens element.

The method may further include providing a fourth lens element at the other surface of the lens substrate through a fourth mold, corresponding to a location of the first lens element.

The polymer layer may have a refractive index lower than refractive indices of the first lens layer and the second lens layer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 3A:
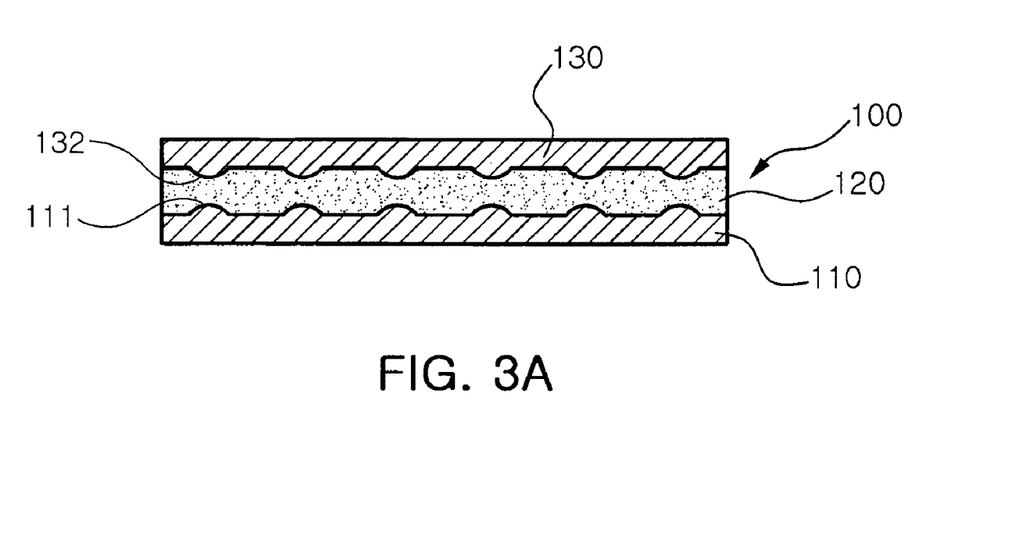
FIGS. 3A and 3B are cross-sectional views of a laminated lens package according to an embodiment of the present invention.
Figure 3B:
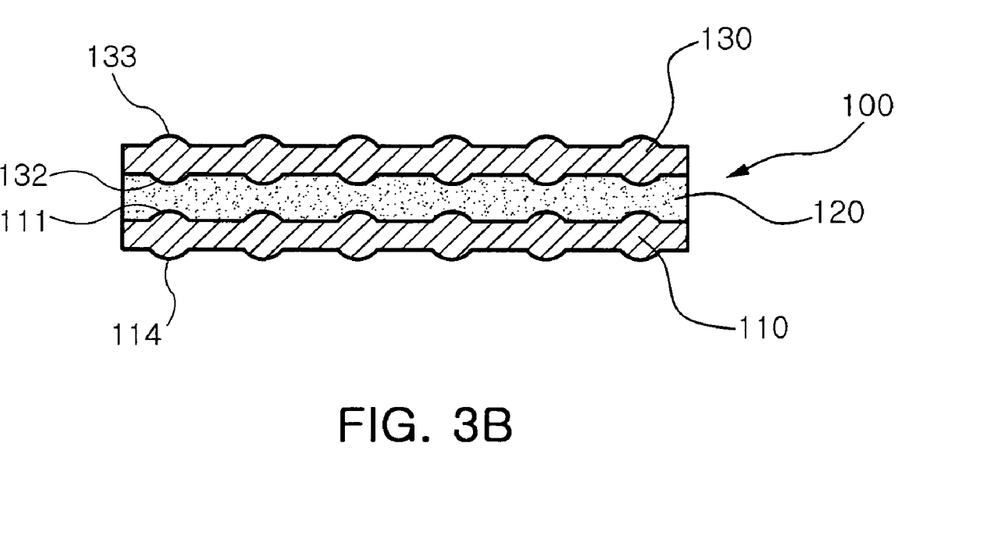

FIGS. 3A and 3B are cross-sectional views of a laminated lens package according to an embodiment of the present invention. FIGS. 4A through 4F are schematic views for explaining a process of fabricating a laminated lens package according to an embodiment of the present invention. FIGS. 5A through 5F are schematic views for explaining a process of fabricating a laminated lens package according to another embodiment of the present invention. FIGS. 6A through 6H are schematic views for explaining a modified example of the process of fabricating a laminated lens package illustrated in FIGS. 5A through 5F.

As shown in FIG. 3A, the laminated lens package 100 according to an embodiment of the present invention includes a first lens layer 110, a second lens layer 130 and a polymer layer 120.

The first lens layer 110 is provided by a general wafer-scale lens fabrication method. To provide the first lens layer 110, a first mold including a recess pattern for a first lens element 111 is pressed down onto a resin applied on a lens substrate. After the resin is cured, the first mold is separated from the lens substrate, thereby forming the first lens layer 110 including the first lens elements 11 at its one surface.

The resin is a UV-curable resin. The first lens layer 110 may be formed of a transparent resin with a high refractive index.

Examples of the transparent resin with a high refractive index may include poly methyl methacrylate (PMMA) with a refractive index of 1.4893, polycarbonate resin(PC) with a refractive index of 1.5860, styrene acrylonitrile copolymer (SAN) with a refractive index of 1.5700, polystyrene(PS) with a refractive index of 1.5894, acrylonitrile butadiene styrene copolymer (ABS), poly vinyl chloride(PVC) of a refractive index of 1.5390, allyl diglicol carbonate(ADC), poly vinylnapthalene(PVN) with a refractive index of 1.6818, poly N-vinyl carbazole(PVK) with a refractive index of 1.6830, and poly pentabromophenyl methacrylate with refractive index of 1.7100.

The second lens layer 130 is formed by the same method as that for the first lens layer 110, and includes a second lens element 132 formed at its one surface through a second mold, corresponding to a location of the first lens elements 111.

The second lens layer 130 is formed of a material that is the same as or different from that of the first lens layer 110. The material for the second lens layer 130 may be selected in due consideration of a refractive index calculated in design of an optical system.

In general, the refractive index of the first lens layer 110 may be higher than the refractive index of the second lens layer 130. However, the present invention is not limited thereto. In some cases, the second lens layer 130 may have a higher refractive index than that of the first layer 130. If the first lens layer 110 and the second lens layer 130 are formed of the same material, they have the same refractive index.

The polymer layer 120 serving as a spacer is formed by curing a polymer material (i.e., a resin) provided between the first lens layer 110 and the second lens layer 130.

The polymer material may be a transparent resin having a refractive index that is lower than the refractive indices of the first and second lens layers 110 and 130.

Examples of the transparent resin having a low refractive index may include ethylene tetrafluoroethylene (ETFE) with a refractive index of 1.400, fluorinated ethylene propylene (FEP) with a refractive index of 1.3380, tetrafluoroethylene hexafluoropropylene vinylidene fluoride (THV) with a refractive index of 1.3500, perfluoroalkoxy (PFA) with a refractive index of 1.3400, teflon AF® with a refractive index of 1.29 to 1.31, and poly hexafluoropropylene oxide (PHFPO) with a refractive index of 1.3010.

Thus, the polymer layer 120 has a lower refractive index than those of the first lens layer 110 and the second lens layer 130. The first lens layer 110 and the second lens layer 130 is spaced apart from each other at an interval previously designed according to the refractive index of each of the first and second lens layers 110 and 130 and the refractive index of the polymer layer 120.

FIG. 3B illustrates a modified example of the multilayered lens package 100 of FIG. 3A. As shown in FIG. 3B, the first lens layer 110 may further include a fourth lens element 114 formed at the other surface of the first lens layer 110 through a fourth mold, corresponding to a location of the first lens element 111. Likewise, the second lens layer 130 may further include a third lens element 133 at the other surface of the second lens layer 130 through a third mold, corresponding to a location of the second lens element 132.

The first lens element 111 and the fourth lens element 114 must be coaxially formed, and the second lens element 132 and the third lens element 133 must also be coaxially formed. The first lens layer 110 and the second lens layer 130 must be disposed to have a common optical axis.

The first lens element 111, the second lens element 132, the third lens element 133 and the fourth lens element 114 may have identical or different radii of curvature. The radii of curvature can be controlled according to a pattern of a mold for each lens element.

According to the current exemplary embodiment of the present invention, the laminated lens package includes the first lens layer 110 and the second lens layer 130. However, the present invention is not limited thereto, and the laminated lens package may include more than two lens layers according to a design of a camera module.

That is, a laminated lens package may include a plurality of lens layers by a method of further forming a third lens layer including a plurality of lens elements, a fourth lens layer including a plurality of lens element, etc. in the same manner as described above, and laminating the formed lens layers.

A method of fabricating a laminated lens package according to an embodiment of the present invention will now be described with reference to FIGS. 4A through 4F.

Referring to FIGS. 4A through 4E, the method of fabricating a laminated lens package according to the current embodiment includes providing a first lens layer 110 including a first lens element 111 at one surface of a first lens substrate 101; providing a second lens layer 130 including a second lens element 132 at one surface of a second lens substrate; disposing the first lens layer 110 and the second lens layer 130 such that the first lens element 111 and the second lens element 132 are coaxially spaced apart from each other at a predetermined interval; and filling a polymer material 120a between the first lens layer 110 and the second lens layer 130 to form a polymer layer 120.

Figure 4A:
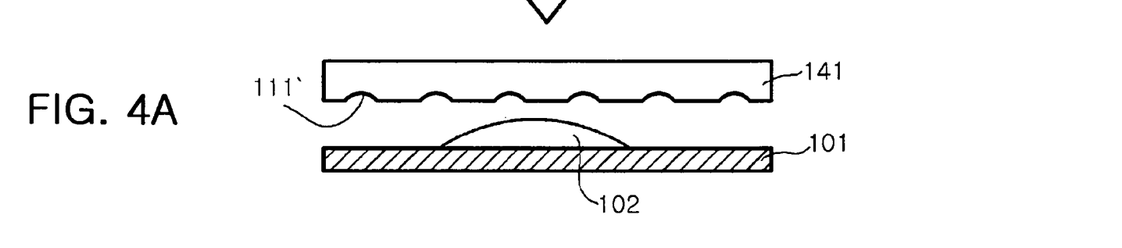
FIGS. 4A through 4F are schematic views for explaining a process of fabricating a laminated lens package according to an embodiment of the present invention.
Figure 4B:
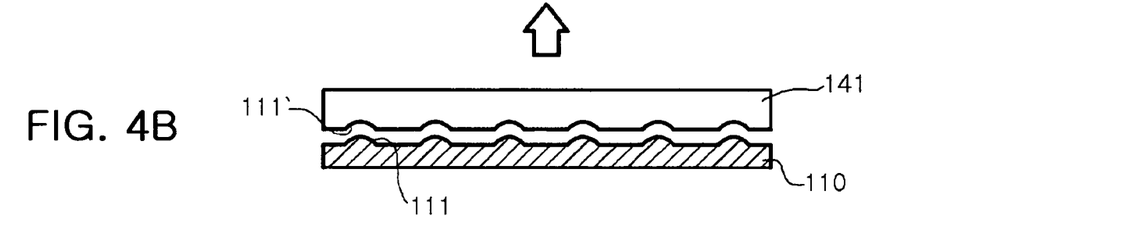

As shown in FIGS. 4A and 4B, the first lens layer 110 is fabricated by a general wafer-scale lens fabrication method. In detail, a first mold 141 including a pattern 111' for the first lens element 111 is pressed down onto a resin 102 applied on the lens substrate 101. Thereafter, the resin 102 is cured, and then, the first mold 141 is separated from the lens substrate 101, thereby fabricating the first lens layer 110 including a plurality of first lens elements 111 at one surface thereof.

The resin 102 may be a UV-curable resin, and the first lens layer 110 may be formed of a transparent resin with a high refractive index.

Examples of the transparent resin having a high refractive index transparent resin are as described above, and the description of the examples of the transparent resin is omitted.

Thereafter, the second lens layer 130 including a plurality of second lens elements 132 at one surface thereof may be fabricated by the same method as that for the first lens layer 110. However, the present invention is not limited thereto, and the second lens layer 130 may be fabricated by a resin molding method through a separately manufactured frame (not shown).

The first lens layer 110 and the second lens layer 130 have identical or different refractive indices, and this can be controlled by selecting a transparent resin with a high refractive index.

According to the current exemplary embodiment of the present invention, the first lens element 111 is provided at one surface of the first lens layer 110, and the second lens layer 132 is provided at one surface of the second lens layer 130. However, the present invention is not limited thereto. As shown in FIG. 4F, a fourth lens element 114 may be provided at the other surface of the first lens layer 110, corresponding to the location of the first lens element 111. A third lens element 133 may be provided at the other surface of the second lens layer 130, corresponding to the location of the second lens element 132.

Figure 4C:
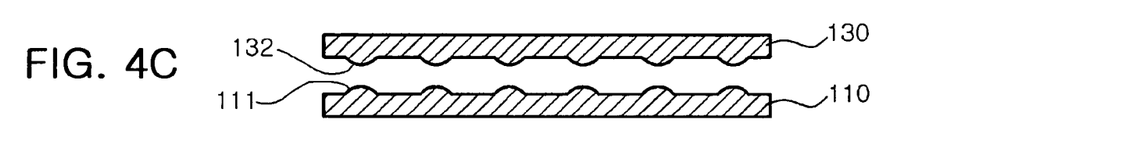

As shown in FIG. 4C, the first lens layer 110 and the second lens layer 130 are spaced apart at an interval previously calculated in due consideration of a refractive index. The first lens element 111 and the second lens element 132 are coaxially disposed.

Figure 4D:
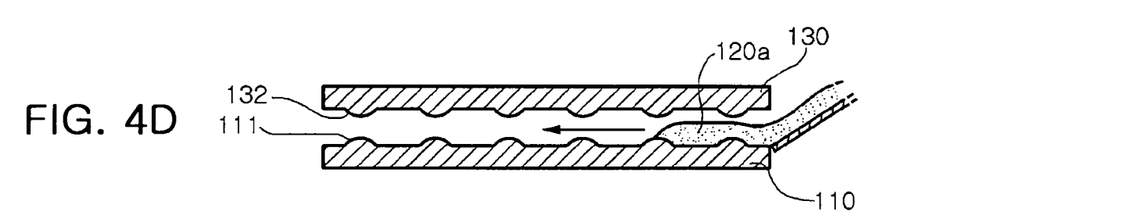
Figure 4E:
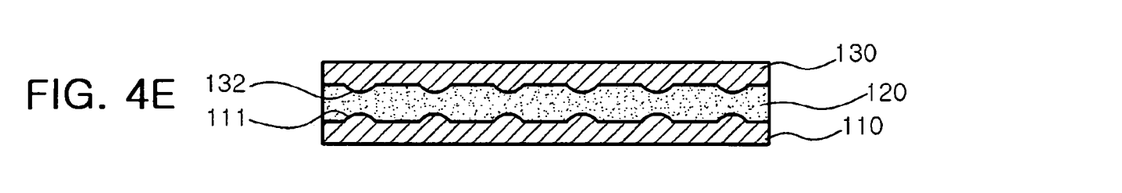
Figure 4F:
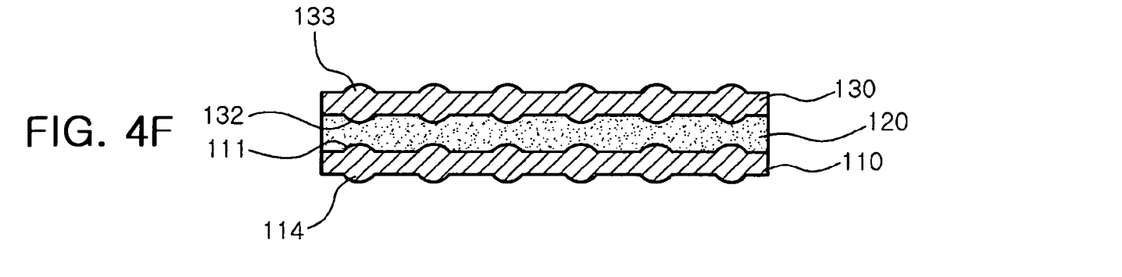

As illustrated in FIGS. 4D and 4E, a polymer material 120a is filled between the first lens layer 110 and the second lens layer 130 and cured to form a polymer layer 120.

The polymer layer 120 may be formed of a transparent resin with a low refractive index, which is lower than refractive indices of the first lens layer 110 and the second lens layer 130. Examples of the transparent resin with a low refractive index are as described above.

Since firm adhesion with the first and second lens layers 110 and 130 is made while the polymer layer 120 is cured between the first and second lens layers 110 and 13, defects caused by the use of an adhesive agent can be prevented from occurring.

Furthermore, the polymer layer 120 maintains the interval between the first and second lens layers 110 and 130. Therefore, there is no need for a spacer, and the first and second lens elements 110 and 130 can be easily coaxially disposed.

Referring to FIG. 5, a method of fabricating a laminated lens package according to another embodiment of the present invention will now be described.

The method of fabricating a laminated lens package according to another embodiment of the present invention includes: providing a first lens layer 110 including a first lens element 111 formed at one surface of a lens substrate 101 through a first mold 141; providing a polymer material 120s at a predetermined height on the first lens layer 110 including the first lens element 111 to form a polymer layer 120; pressing a second mold 142 onto the polymer layer 120 to form a pattern for the second lens element 132 at a location of the polymer layer 120 corresponding to a location of the first lens element 111; providing a resin 130a on the polymer layer 120 in which the pattern for the second lens element is recessed; and providing a second lens 130 including the second lens element 132 at its one side.

Figure 5A:
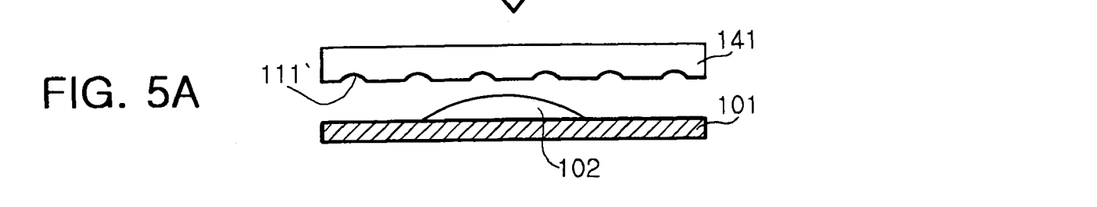
FIGS. 5A through 5F are schematic views for explaining a process of fabricating a laminated lens package according to another embodiment of the present invention.
Figure 5B:
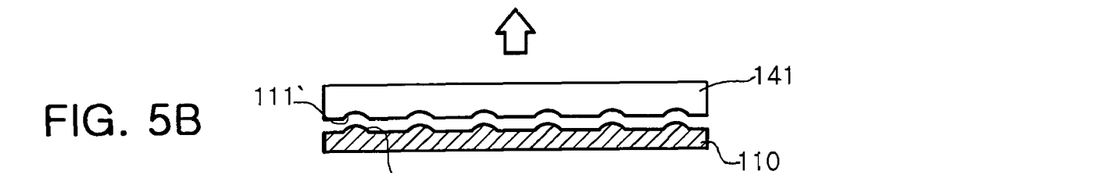

As shown in FIGS. 5A and 5B, the first lens layer 110 is formed by the same method as that of the previous embodiment of FIGS. 4A through 4F. Therefore, description thereof is omitted.

Figure 5C:
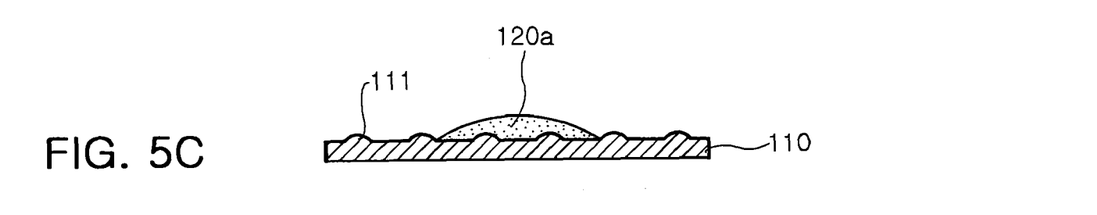

Thereafter, as illustrated in FIG. 5C, the polymer material 120a is provided at a predetermined height on the first lens layer 110 including the first lens element 111, thereby forming the polymer layer 120.

The height of the polymer material 120a is previously calculated in due consideration of the size of an optical system and refractive indices of the first and second lens layers 110 and 130.

The polymer material 120a may be a transparent resin having a low refractive index, which is lower than the refractive index of the first lens layer 110. Examples of the transparent resin with a low refractive index are as described as above.

Figure 5D:
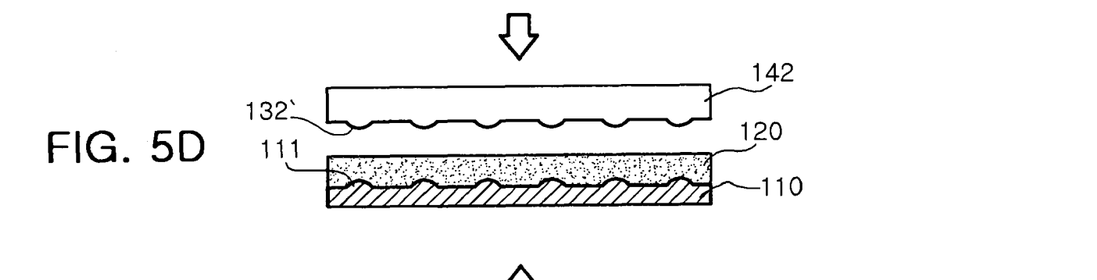
Figure 5E:
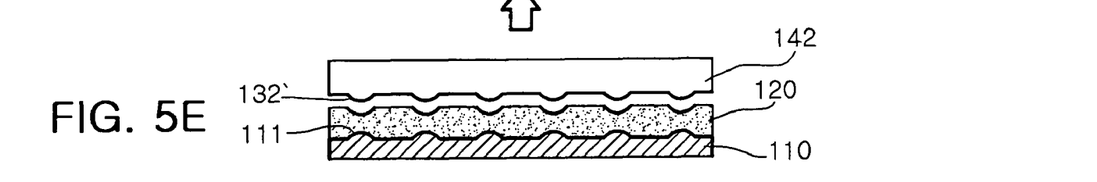

Thereafter, as shown in FIGS. 5D and 5E, the second mold 142 is pressed onto the polymer layer 120 to form a pattern for a plurality of second lens elements 132 at a location corresponding to the location of each first lens element 111.

The second mold 142 includes a protruding pattern 132' for the plurality of second lens elements 132. Thus, when the second mold 142 is pressed onto the polymer layer 120, the pattern for the second lens elements 132 are recessed in the polymer layer 120.

According to the current exemplary embodiment of the present invention, the second mold 142 is pressed onto the cured polymer layer 120. However, the present invention is not limited thereto, and the polymer layer 120 may be cured while being pressed with the second mold 142.

Figure 5F:
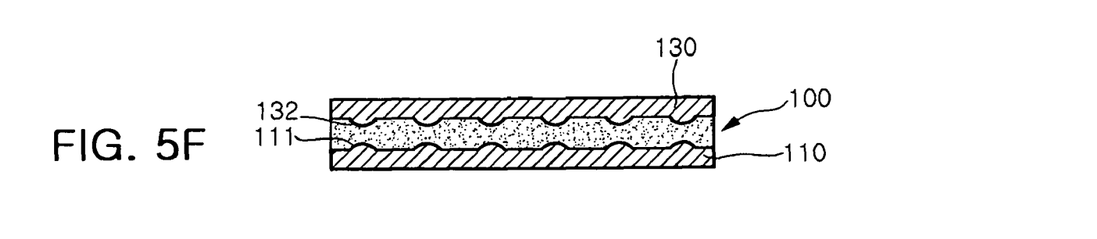

Thereafter, as shown in FIG. 5F, a resin 130a is provided on the polymer layer 120 in which the pattern for the second lens elements 132 is recessed, and cured to form the second lens layer 130 including the second lens elements 132 at its one side.

The first lens layer 110 and the second lens layer 130 have identical or different refractive indices, and this may be controlled by selecting a transparent resin with a high refractive index.

Alternatively, the second lens layer 130 may include a third lens element 133 at the other surface of the second lens layer 130, corresponding to a location of the second lens element 132. This will now be described in more detail with reference to FIGS. 6A through 6H.

Processes for forming the polymer layer 120 on the first lens layer 110 and recessing the polymer layer 120 to form pattern for the second lens elements 132, illustrated in FIGS. 6A through 6E, are identical to those illustrated in FIGS. 5A through 5E. Therefore, description thereof is omitted.

Figure 6A:
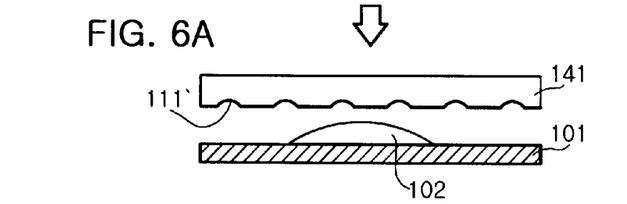
FIG. 6A through 6H are schematic views for explaining a modified example of the process of fabricating a laminated lens package illustrated in FIGS. 5A through 5F.
Figure 6B:
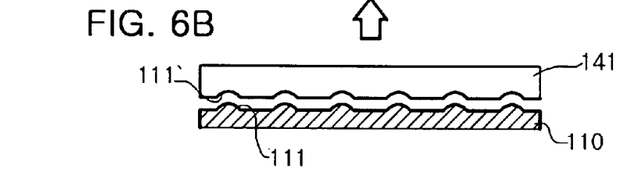
Figure 6C:
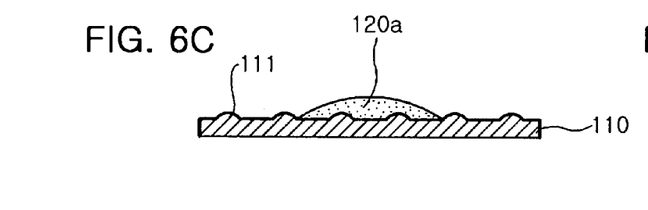
Figure 6D:
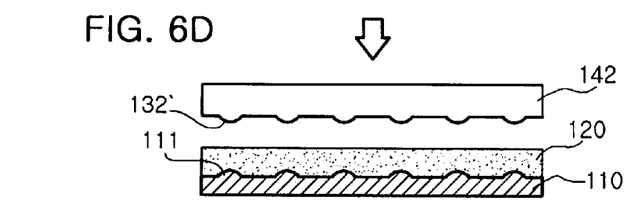
Figure 6E:
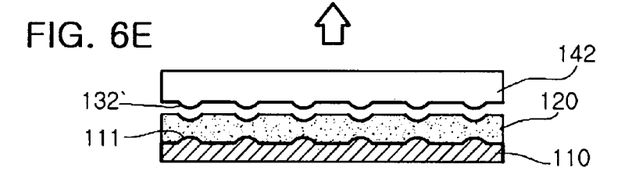
Figure 6F:
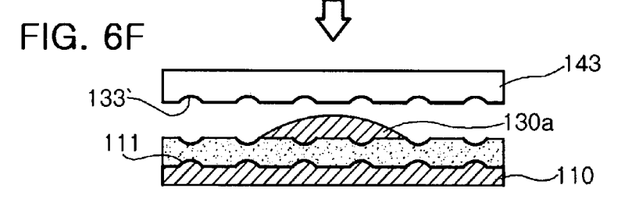
Figure 6G:
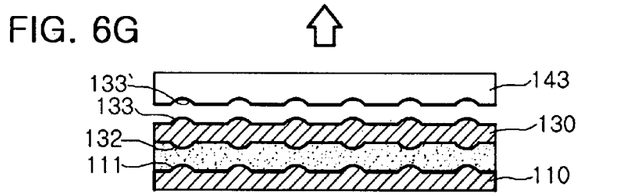

Thereafter, as illustrated in FIGS. 6F and 6G, a third mold 143 is pressed onto the resin 130a provided on the polymer layer 120 including the recess pattern for the second lens element 132, and then the resin 130a is cured. Thus, the second lens elements 132 and third lens elements 133 are simultaneously formed.

The third mold 143 includes a recess pattern 133' for a plurality of third lens elements 133, respectively corresponding to locations of the second lens elements 132.

Figure 6H:
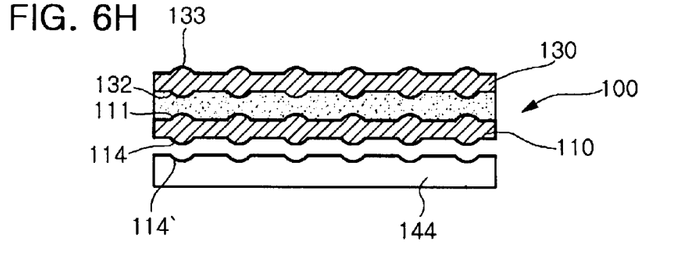

The first lens layer 110 may include a fourth lens element 114 at the other surface, which is opposite to the one surface where the first lens element 111 is provided, corresponding to the location of the first lens element 111.

That is, as shown in FIG. 6H, a resin is provided onto the other surface of the lens substrate 101 forming the first lens layer 110. Then, a fourth mold 144 including a recess pattern 114' for the fourth lens element 114 is pressed onto the resin, and thereafter, the resin is cured. After the resin is cured, the fourth mold 144 is separated from the lens substrate 101, thereby forming the first lens layer 110 including a plurality of fourth lens elements 114.

The resin is the same as the resin of the first lens element 111, and may be a UV-curable resin.

In the laminated lens package 100 according to the embodiments of the present invention, firm adhesion with the first lens layer 110 is made while the polymer layer 120 on the first lens layer 110 is cured. Also, the second lens layer 130 on the polymer layer 120 is firmly adhered to the polymer layer 120 while being cured. Accordingly, defects caused by the use of an adhesive agent can be prevented from occurring.

Besides, since the polymer layer 120 maintains an interval between the first and second lens layers 110 and 130, there is no need for a separate spacer, and the lens elements at the first and second lens layers 110 and 130 can be easily disposed with a common axis, i.e., coaxially.

Also, desired refraction can be implemented by controlling a refractive index through the polymer layer 120 provided between the first and second lens layers 110 and 130.

According to the exemplary embodiments, the method of fabricating the laminated lens package including the first lens layer and the second lens layer have been described. However, the present invention is not limited thereto, and the laminated lens package may include more than two lens layers according to a design of a camera module.

That is, a laminated lens package including a plurality of lens layers can be obtained by a method of further forming a third lens layer including a plurality of lens elements, a fourth lens layer including a plurality of lens element, etc. in the same manner as described above, and laminating the formed lens layers.

According to the present invention, desired refraction can be implemented by controlling a refractive index. Also, since no spacers are used, defects caused by adhesion of an adhesive agent do not occur. Thus, a fabrication process is simplified, so that productivity can be improved and a fabrication cost can be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of fabricating a laminated lens package, the method comprising:
    providing a first lens layer comprising a first lens element formed at one surface of a lens substrate through a first mold;
    providing a polymer material at a predetermined height on the first lens layer comprising the first lens element;
    pressing a second mold onto the polymer layer to form a pattern for a second lens element at a location in the polymer layer corresponding to a location of the first lens element;
    providing a resin on the polymer layer in which the pattern for the second lens element is recessed; and
    providing a second lens layer comprising the second lens element at one surface thereof.

2. The method of claim 1, wherein the first lens layer and the second lens layer have identical or different refractive indices.

3. The method of claim 1, further comprising pressing a third mold onto the resin provided on the polymer layer to simultaneously form the second lens element and a third lens element.

4. The method of claim 3, wherein the third lens element is provided at the other surface of the second lens layer, corresponding to a location of the second lens element.

5. The method of claim 1, further comprising providing a fourth lens element at the other surface of the lens substrate through a fourth mold, corresponding to a location of the first lens element.

6. The method of claim 1, wherein the polymer layer has a refractive index lower than refractive indices of the first lens layer and the second lens layer.

* * * * *